United States Patent
Claycomb et al.

(10) Patent No.: US 6,543,117 B1
(45) Date of Patent: *Apr. 8, 2003

(54) INTERNAL FORCE APPLICATION APPARATUS AND METHOD OF USE FOR STRETCHING A WINDSHIELD SEAL

(75) Inventors: Kevin Claycomb, Jamestown, CA (US); Sandra Claycomb, Jamestown, CA (US)

(73) Assignee: Sandra Gaskell, Modesto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/638,303

(22) Filed: Aug. 14, 2000

Related U.S. Application Data (63) Continuation of application No. 09/025,739, filed on Feb. 19, 1998, now Pat. No. 6,101,702.

(51) Int. Cl.⁷ .............................. B23P 19/02; B25B 11/00
(52) U.S. Cl. ....................... 29/426.4; 29/426.6; 29/239
(58) Field of Search ............................ 29/559, 426.4, 29/426.5, 426.6, 244, 281.4, 252, 239; 269/17, 21, 60, 71, 76, 79, 909, 61; 254/230, 84, 95, DIG. 4

(56) References Cited

U.S. PATENT DOCUMENTS

| | | | |
|---|---|---|---|
| 1,580,358 A | | 4/1926 | Wright |
| 2,803,872 A | | 8/1957 | Massa |
| 2,814,099 A | | 11/1957 | Knittel |
| 2,827,690 A | | 3/1958 | Brown |
| 3,662,994 A | * | 5/1972 | Johns .......................... 29/239 |
| 4,183,511 A | | 1/1980 | Marek |
| 4,209,166 A | | 6/1980 | DeRouen |
| 4,429,861 A | | 2/1984 | Range |
| 4,932,639 A | | 6/1990 | Fjellstrom |
| 5,622,093 A | | 4/1997 | Hutchins |
| 5,707,450 A | | 1/1998 | Thompson |
| 5,863,034 A | | 1/1999 | Vauter |
| 5,953,802 A | | 9/1999 | Radzio |
| 6,101,702 A | * | 8/2000 | Claycomb et al. ......... 29/426.4 |

* cited by examiner

Primary Examiner—David P. Bryant
(74) Attorney, Agent, or Firm—Heisler & Associates (57) ABSTRACT

A windshield lift acting between the floor of a vehicle and the inside surface of the windshield with the aid of suction cups to apply an outward force to place the seal which bonds the windshield to the vehicle frame under tension. The peripheral seal can then be easily cut with a knife.

13 Claims, 8 Drawing Sheets

INTERNAL FORCE APPLICATION APPARATUS AND METHOD OF USE FOR STRETCHING A WINDSHIELD SEAL

CROSS-REFERENCE TO RELATED APPLICATIONS

This application is a continuation of U.S. application Ser. No. 09/025,739, filed on Feb. 19, 1998, now U.S. Pat. No. 6,101,702.

FIELD OF THE INVENTION

This invention relates to a tool which simplifies the task of removing a cracked or broken windshield in an automobile.

BACKGROUND OF THE INVENTION

A conventional windshield is secured to the frame opening in the vehicle body by means of a peripheral urethane bond. When this bond cures the windshield is firmly sealed in the frame for the life of the automobile. However, due to the impact of stones and metal objects thrown up into the path of travel, windshields can be cracked or broken. Vandalism is also a problem.

A common practice to remove a defective windshield requires the mechanic to position himself in the vehicle with his head and shoulders pressed against the windshield to apply an outward pressure. While maintaining this pressure he must cut the urethane bond at the top and sides and pivot the partially loosened windshield about the bottom so as to cut the bottom bond without damaging any adjacent vehicle components. This procedure is dangerous and can traumatize the mechanic's neck and/or risk cuts.

There is a need for a tool to simplify the operation and substitute mechanical pressure against the windshield for human head and shoulder pressure.

The following prior art reflects the state of the art of which applicant is aware and is included herewith to discharge the applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| U.S. Pat. No. | ISSUE DATE | INVENTOR |
| --- | --- | --- |
| 1,863,897 | Jun. 21, 1932 | Cloppert |
| 2,014,535 | Sep. 17, 1935 | Maca |
| 2,305,995 | Dec. 22, 1942 | Roberts |
| 2,746,767 | May 22, 1956 | Evans |
| 3,116,919 | Jan. 7, 1964 | Alth |
| 3,620,524 | Nov. 16, 1971 | Czompi |
| 3,662,994 | May 16, 1972 | Johns |
| 3,770,259 | Nov. 6, 1973 | Wagreich |
| 3,804,397 | Apr. 16, 1974 | Neumann |
| 4,457,503 | Jul. 3, 1984 | Connor |
| 5,042,772 | Aug. 27, 1991 | Madjeski |
| 5,085,415 | Feb. 4, 1992 | Shaver |
| 5,087,019 | Feb. 11, 1992 | Peabody, et al. |
| 5,135,205 | Aug. 4, 1992 | Bedard |
| 5,479,689 | Jan. 2, 1996 | Schmit, et al. |

A number of tool assemblies to aid the mechanic in removing and installing automobile windshields have been invented as typified by U.S. Pat. No. 3,620,524, issued Nov. 16, 1971, to Joseph Czompi; U.S. Pat. No. 5,085,415, issued Feb. 4, 1992, to Craig Shaver; and U.S. Pat. No. 5,479,689, issued Jan. 2, 1996, to David Schmit, et al. The patent to Czompi shows two spaced suction cups connected to an adjustable assembly to support a windshield while it is being installed. Shaver shows a windshield support mounted on the steering wheel to space a portion of the windshield from the frame opening. Schmit, et al. Shows a hand held tool to separate a windshield from the upper frame in order to expose the bottom seal for cutting.

While the above-mentioned patents do teach tools to facilitate the removal and replacement of windshields, the prior art does not teach a windshield removal tool having the flexibility or attachment and precise adjustability to safely push a windshield out of a supporting frame.

The other prior art listed above, but not specifically described further catalog the prior art of which the applicant is aware. These references diverge even more starkly from the references specifically distinguished above.

OBJECTS OF THE INVENTION

The overall object of the invention improves upon the prior art windshield removal tools by providing a telescoping lift acting between the floor and windshield to apply a controlled pushing pressure against the windshield.

It is a specific object of the invention to apply the pressure to the windshield by means of two spaced suction cups which are adjustable with respect to the telescoping lift so as to apply the pressure in the most desirable area. The suction cups and mounting, while attached to the windshield, may be separated from the lift to serve as a carrier to remove the damaged windshield from the vehicle.

It is another object of the invention to provide an adjustment mechanism to extend the telescoping lift in a precise manner so as to maintain the correct pressure against the windshield.

It is yet another object of the invention to provide an adjustable base for the telescoping lift as well as an adjustable support at the top of the lift to enable universal positioning of the suction cups.

Viewed from a first vantage point it is an object of the invention to provide a windshield lift for applying pressure on the inside surface of a windshield comprising a base member, first and second cylindrical members, said first cylindrical member telescopically supported with respect to said second cylindrical member for reciprocating motion to extend and retract said cylindrical members with respect to each other, means on an end of said second cylindrical member remote from said first cylindrical member for pivotally mounting said second cylindrical member on said base member, an end of said first cylindrical member remote from said second cylindrical member supporting a bracket, an elongated support member having first and second ends, said first end being pivotally mounted on said bracket said second end supporting means to frictionally engage said windshield inside surface, and means to extend said cylindrical members.

Viewed from a second vantage point it is an object of the invention to provide a windshield lift for removing a windshield from a vehicle frame by applying pressure to the inside surface comprising a base member for positioning on the floor of a vehicle, a telescoping lift comprising at least two telescoping sections, drive means to reciprocate one of the sections with respect to the other, the fixed section being pivotally mounted on said base member so as to angle the lift in the direction of the windshield, a support bracket mounted on the free end of said movable section, a T-shaped work holder 38 having the stem of the T pivotally and removably mounted on said bracket, and a suction cup mounted on each end of the crossarm of the T-shaped work holder 38.

Viewed from a third vantage point it is an object of the invention to provide a method for the removal of a vehicle windshield from a vehicle frame wherein said windshield is bonded to said frame by means of a peripheral plastic seal, said method comprising the steps of: installing an adjustable lift acting to supply a force against the internal surface of the windshield; gradually increasing the force applied to the windshield until the first sign of stretching of the seal is noticed; cutting the top seal while in a stretched condition; slowly increasing the force on the window stretching to side seals; freeing the side seals; with top and side seals free continue applying force to the windshield pivoting the windshield around its bottom edge; cutting the bottom seal; and removing the windshield.

These and other objects will be made manifest when considering the following detailed specification when taken in conjunction with the appended drawing figures.

DESCRIPTION OF THE PREFERRED EMBODIMENT

Considering the drawings, wherein like reference numerals denote like parts throughout the various drawing figures, reference numeral 10 is directed to the windshield lift according to the present invention.

Referring now in general to the drawings and in particular to FIGS. 1 through 8, the novel windshield lift 10 of this invention comprises a main cylindrical tube 11 telescopically receiving a slidable cylindrical tube 12. The outside surface of the tube 11 may be provided with a polished surface for decorative purposes, or alternatively, provided with a soft plastic covering to prevent damage to the automobile interior. An extension cylinder 13 is inserted within tube 11 to abut stops 14 internally secured to tube 11. The bottom of extension cylinder 13 projecting below tube 11 is flattened to form a tail piece 15. A base 16 having spaced legs 17 made of plastic material is provided with a channel 18 formed between a pair of upstanding walls 2 to receive the tail piece 15. A headed pin 19 is passed through aligned holes 24 in the tail piece 15 and walls 2 of the base 16 to pivotally support the extension cylinder 13. A nut 20 is secured to pin 19 to hold the extension cylinder 13 in position and to allow for its removal for reasons explained below.

Figure 1:
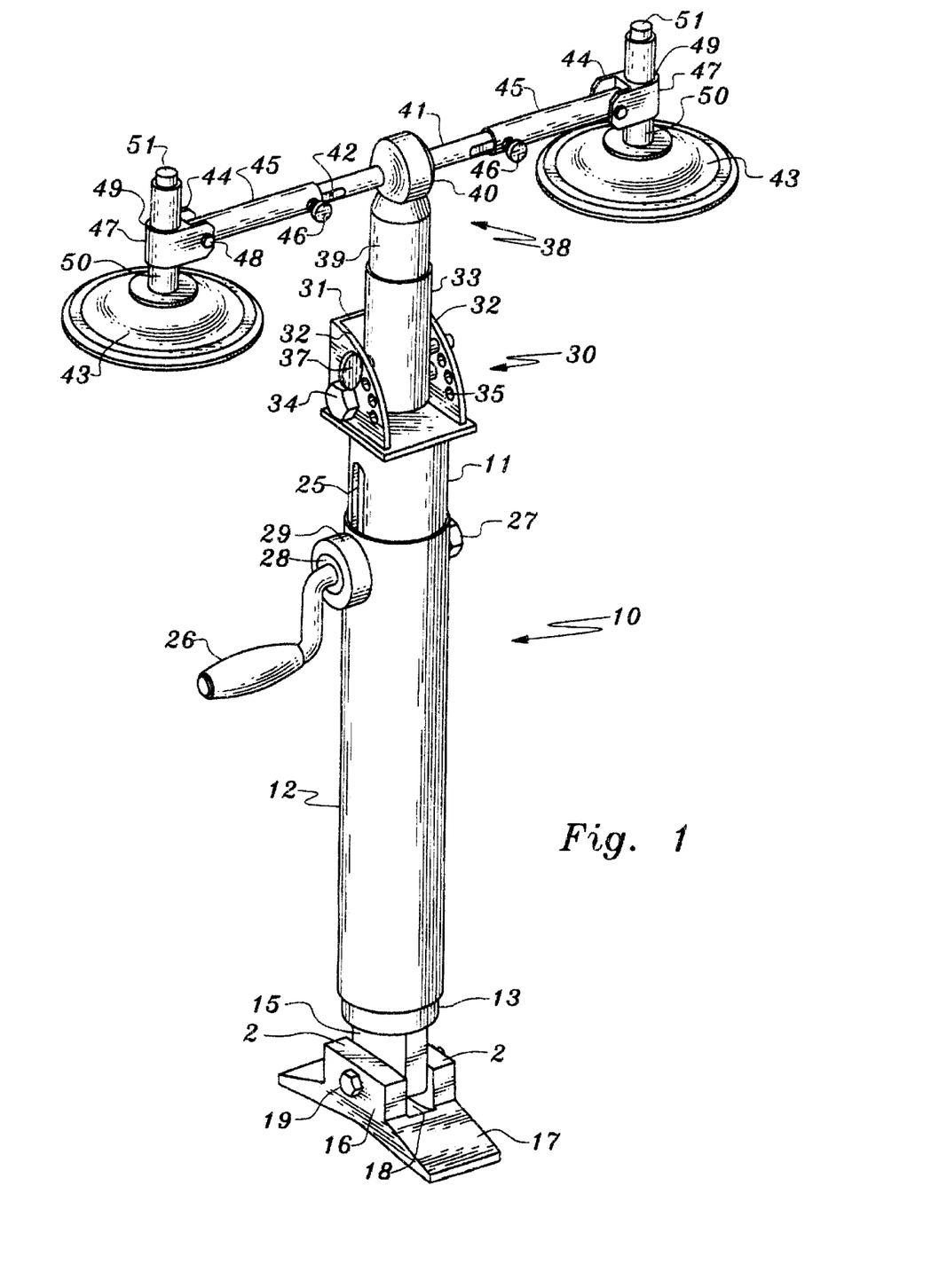
FIG. 1 is a perspective view of the apparatus of the invention.
Figures 2, 3:
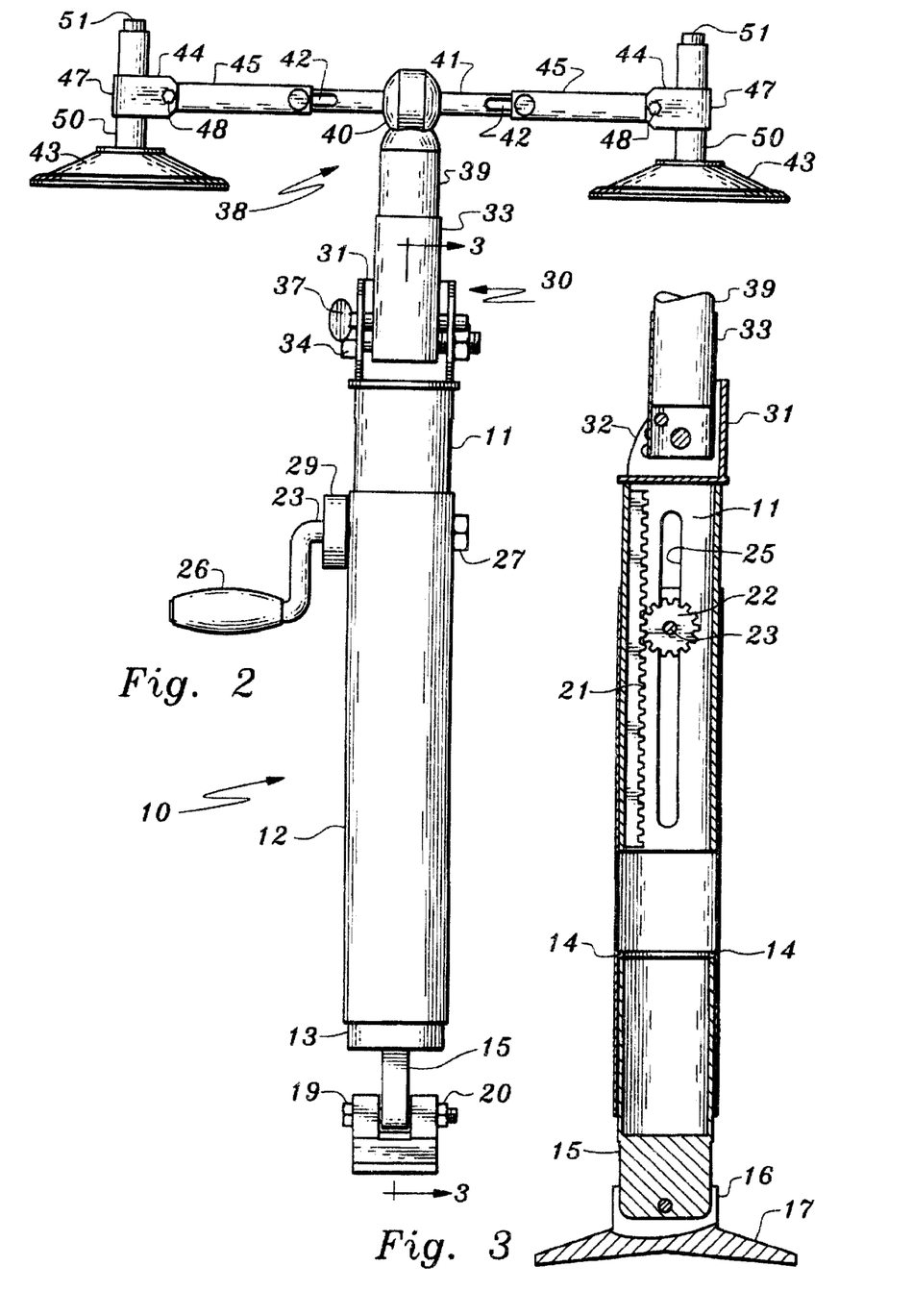
FIG. 2 is a front view of the invention.
FIG. 3 is a sectional view of the invention taken along lines 3—3 of FIG. 2.

As best seen in FIGS. 1 and 2, extension cylinder 13 is carrying main tube 11 can be rotated clockwise around pin 19 to adjust the lift 10 from a vertical position through a range of almost 90 degrees. It should be understood that extension cylinder 13 can be made in various lengths to adapt the lift 10 for different uses. To change the extension cylinder 13, nut 20 is removed and pin 19 slid out. The extension cylinder 13 is then removed and replaced with one of a different length by inserting it in tube 11 until it strikes stop 14. The lift 10 is then set in channel 18 and the pin 19 inserted and secured by nut 20.

Figure 8:
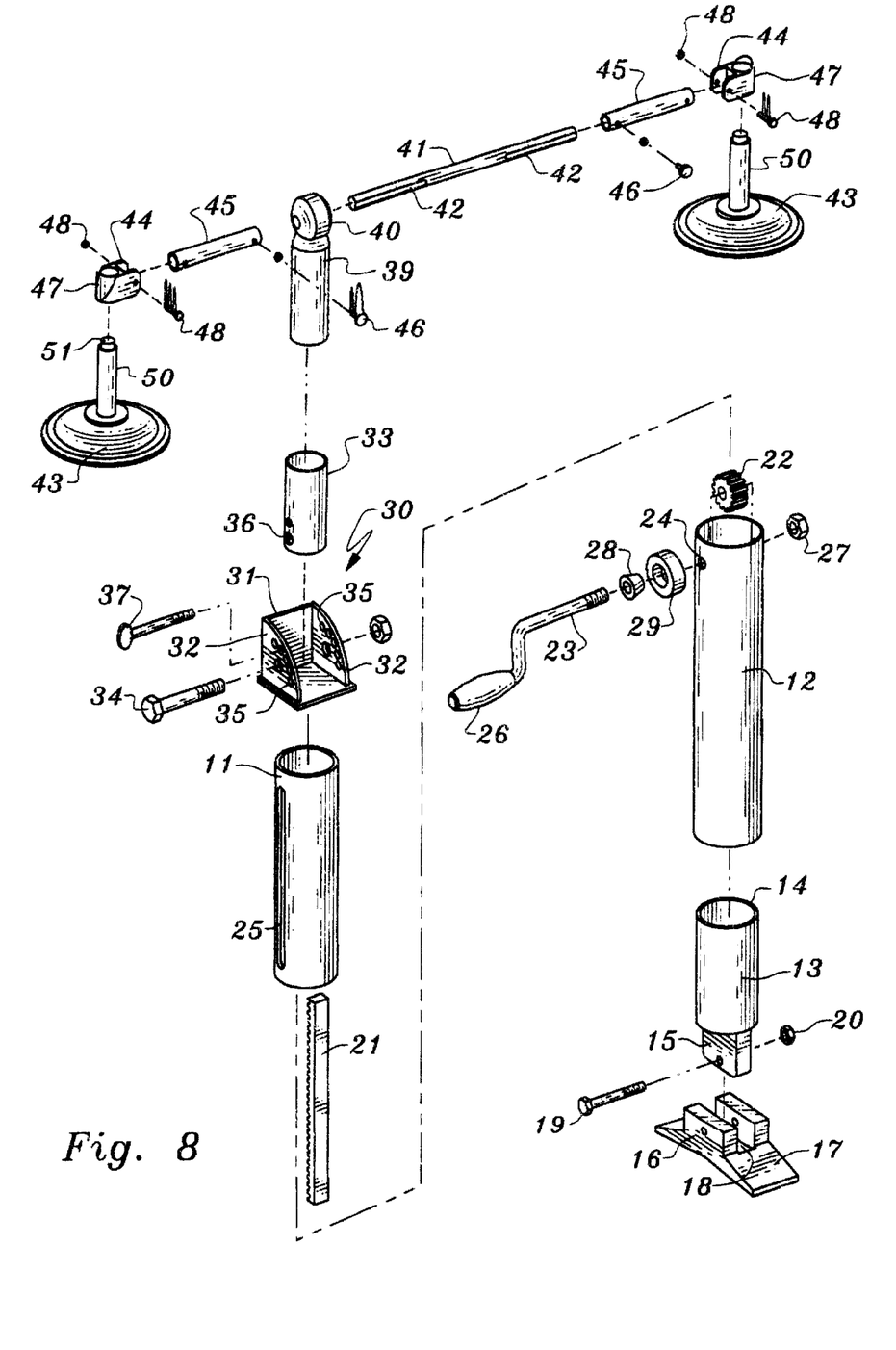
FIG. 8 is an exploded parts perspective view of the invention.

Slidable tube 11 is reciprocated by means of a rack and pinion gear 21, 22 (FIGS. 3 and 8). Rack gear 21 is vertically secured to the internal surface of tube 11 as seen in FIG. 3. Pinion gear 22 is secured on shaft 23 which passes through aligned holes 24 in the main tube 11. Shaft 23 also passes through diametrically opposed longitudinal slots 25 cut into the tube 12. One end of shaft 23 is provided with a crank handle 26 while the other end is positioned by shaft nut 27. Rotation of handle 26 rotates pinion 22 which drives rack gear 21 to extend or retract tube 12 with respect to main tube 11. Tube 12 is maintained in aligned position by shaft 23 passing through longitudinal slots 25. A conventional shaft locking mechanism is provided at 28 to retain the crank handle 26 in a set position. Rotation of threaded nut 29 causes a wedging action against shaft 23.

While a rack and pinion drive is disclosed for explanatory purposes, it should be clearly understood that many other mechanical drives and linkages are available to extend tube 12 with respect to main tube 11. For example, tube 12 may be reciprocated by means of a hydraulic or electric drive, or even a cable and pulley system.

A bracket 30 formed of a back wall 31 joined by two spaced curved side walls 32 is firmly secured to the top end of slidable cylindrical tube 12. A stub tube holder 33 is mounted between the side walls 32 of the bracket 30 for a limited range of angular adjustments. For this purpose a pivot pin 34 is passed through aligned holes 24 in the side walls 32 and holder 33 and permanently staked in position. In this manner holder 33 is permanently secured in bracket 30 while capable of limited angular adjustment. In order to effect this adjustment, a series of paired holes 35 arranged in an arcuate manner around pin 34 as a center are provided in the side walls 32. A hole 36 is drilled through holder 33 to sequentially align with arcuate holes 35 as the holder 33 is rotated around pivot 34. At the desired location of hole registration a pin 37 with a thumb grip is inserted to pass through the holes 24 in the side walls 32 and holder 33 to secure the holder 33 in a set angular position. It should be noted that holder 33 may be positioned so as to extend axially with tube 12, at right angles to tube 12 and a number of angular positions there between.

Holder 33 removably supports a generally T-shaped work holder 38. The stem of the T shaped work holder 38 consists of a coupling rod 39 which removably seats in holder 33 and has its other end secured to a tie rod 40. The crossarm 41 of the T is formed as a rod and passes through tie rod 40 and is secured thereto. Each arm of the cross is provided with flattened surfaces 42 on a side.

Figures 4, 5, 6, 7:
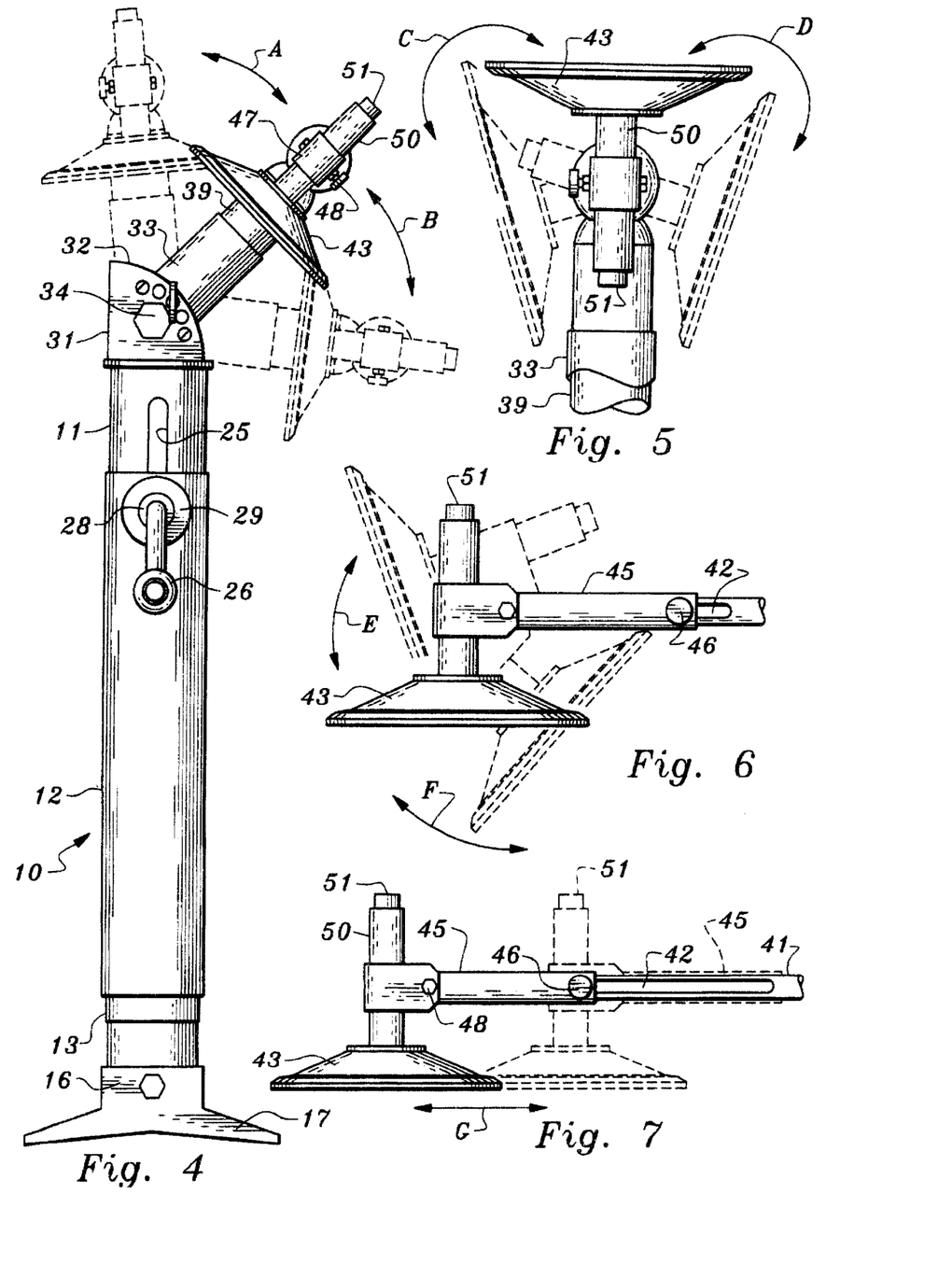
FIG. 4 is a side view of the invention showing alternate positions of the top portion in phantom.
FIG. 5 is a side view of the top portion of the invention showing alternate positions of the suction device in phantom.
FIG. 6 is a front view similar to FIG. 5.
FIG. 7 is a front view of the invention suction cup arm showing alternate lateral position in phantom.

A suction cup 43 is adjustably secured on each arm of the cross 41 by means of a suction cup holder 44 which comprises a tubular collar 45 telescoped over each arm of the cross. A finger tightening set screw 46 is provided near one end of tube 45 to position it on arm 41. Tightening of screw 46 against flattened surfaces 42 positions tube 45 on arm 41. The other end of tube 45 holds a clamp 47 which is bolted to an end portion of hollow tube 45 by means of bolt and nut 48. Clamp 47 has an opening 49 to securely receive the supporting shaft 50 of suction cup 43. Suction cup 43 is of conventional construction and has a plunger vacuum pump 51 mounted in shaft 50. Manual operation of pump 51 (along arrow H of FIG. 10) draws a vacuum between the suction cup 43 and its attached windshield W. Because of its attachment to tube 45 by bolt and nut 48, clamp 47 with attached suction cup 43 is capable of an arcuate adjustment around bolt 48 acting as a pivot. As shown in FIGS. 5 and 6, suction cup 43 may be pivoted along arcs C and D or arcs E and F as needed.

While suction cups are to be preferred, it should be noted that friction pads and other attachments may be employed instead of suction cups without departing from the scope of the invention.

From FIGS. 4 through 7 it can be seen that the suction cups 43 can be adjustably positioned with respect to the windshield W by means of: (1) rotation around bolt 48 acting as a pivot (as described above), (2) slidable adjustment of hollow tube 45 with respect to crossarm 41 (as along double arrow G in FIG. 7), (3) rotation of rod 39 in holder 33 (as shown in FIG. 4 along arcs A and B) and (4) pivotal adjustment of holder 33 in bracket 30 (as described above).

Figure 9:
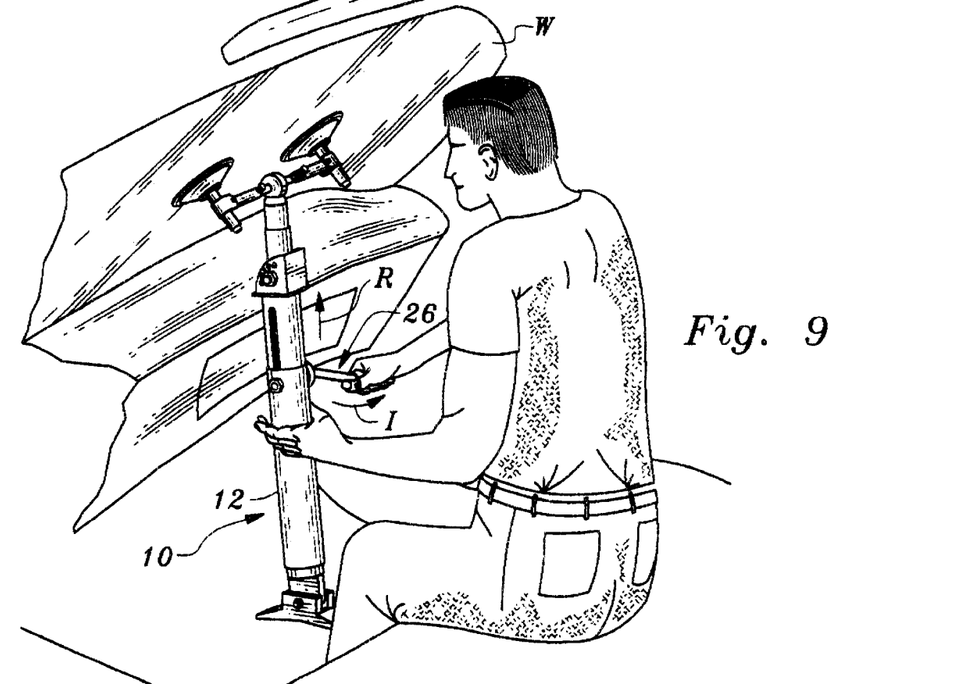
FIG. 9 is a pictorial view of the invention mounted in operative position.

Operation of the windshield lift 10 shown in FIGS. 1 through 8 will be explained in connection with the pictorial views shown in FIGS. 9 through 13. Referring first to FIG. 9, the lift 10 is positioned in the automobile with the base 16 supported on the floor and the lift 10 itself angled toward the windshield W. The lift 10 along with the work holder 38 and suction cups 43 are shifted and adjusted as explained above until a best fit position is found for the suction cups 43 in relation to the windshield W. The suction cups 43 are then pumped (FIG. 10) one at a time to create a vacuum to securely grip the windshield W. Handle 26 is then cranked around arcuate arrow I extending tube 11 along arrow R and exerting a force on the work holder 38 and suction cups 43 tending to outwardly push the windshield W. Sufficient force must be applied to stress the seal, but not enough to shatter the windshield W. This technique develops with experience.

Figure 11:
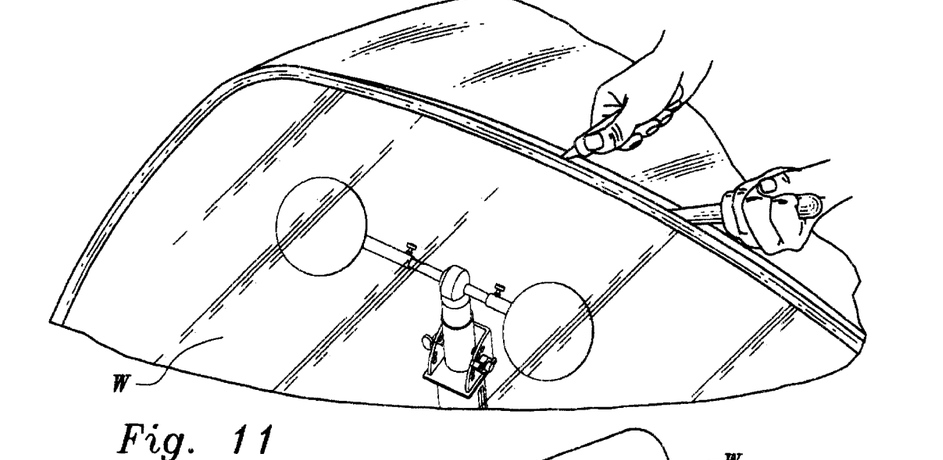
FIG. 11 is a pictorial view showing the windshield bond being cut along the top edge.
Figure 12:
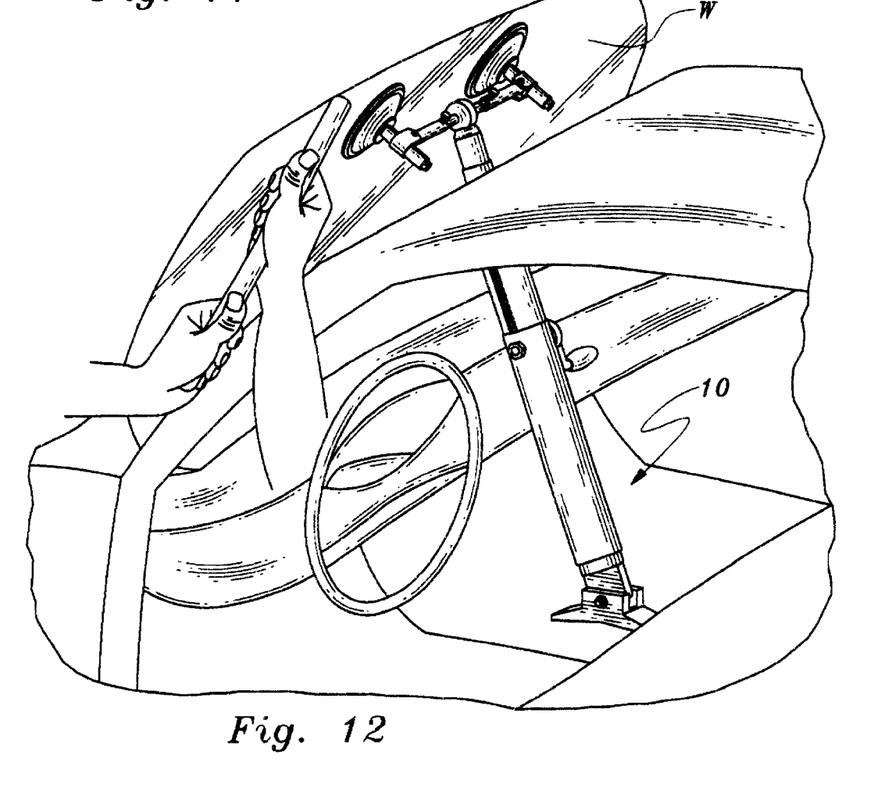
FIG. 12 is a pictorial view of the windshield being pushed out after cutting the bond along side edges of the windshield.

After the seal is sufficient stressed, the technician goes outside and cuts the top seal with a sharp knife (FIG. 11). It has been discovered that when sufficiently stressed in tension, the seal can be cut more easily than an unstressed seal. After the top seal is cut, the side seals are cut while maintaining pressure on the seals with the crank handle. With the top and side seals cut, the handle 26 is cranked until the windshield W is pivoted out of the frame around the bottom seal which is then cut (FIG. 12) to totally free the windshield W.

Figures 13, 14:
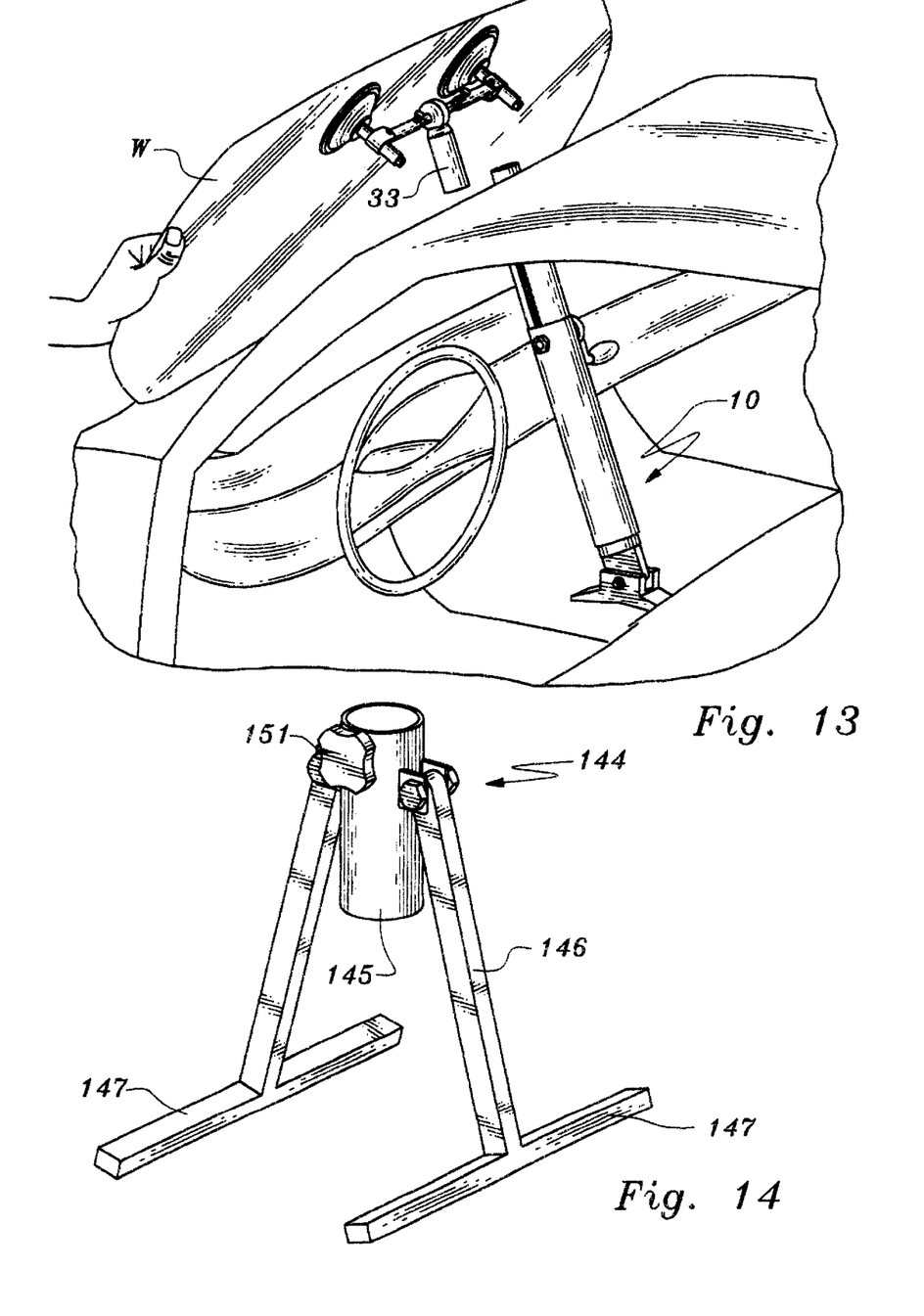
FIG. 13 is a pictorial view of the windshield being removed.
FIG. 14 shows a self supporting stand usable with the lift of this invention.

As shown in FIG. 13, the final step in the operation is to rotate the windshield W so as to free the T-shaped work holder 38 along with its attached suction cups 43 from stub tube holder 33, leaving the lift body to lean against the dashboard. The work holder 38, along with the attached windshield W can then be carried off. Note the suction cup 43 holds the windshield W sufficiently to allow it to be a handle in carrying the windshield W.

FIG. 14 shows a modification for utilizing the disclosed lift 10 in a free standing mode of operation. Instead of the pivoted base 16 shown in FIG. 1, FIG. 14 shows a free standing base 144 having a cup shaped holder 145 supported by a pair of diverging struts 146 which are securely welded thereto. End portions of the struts 146 are welded to a pair of spaced, parallel feet 147 which engage a supporting surface.

The holder 145 supports the end portion of extension tube 13 including tail piece 15. By removing pin 19 from base 16, the same extension bar 13 can be used in the free standing base 144 by replacing pin 19 with hand screw knob 151. When so mounted, the lift 10 operates as explained in FIGS. 1 through 8.

Figures 15, 16:
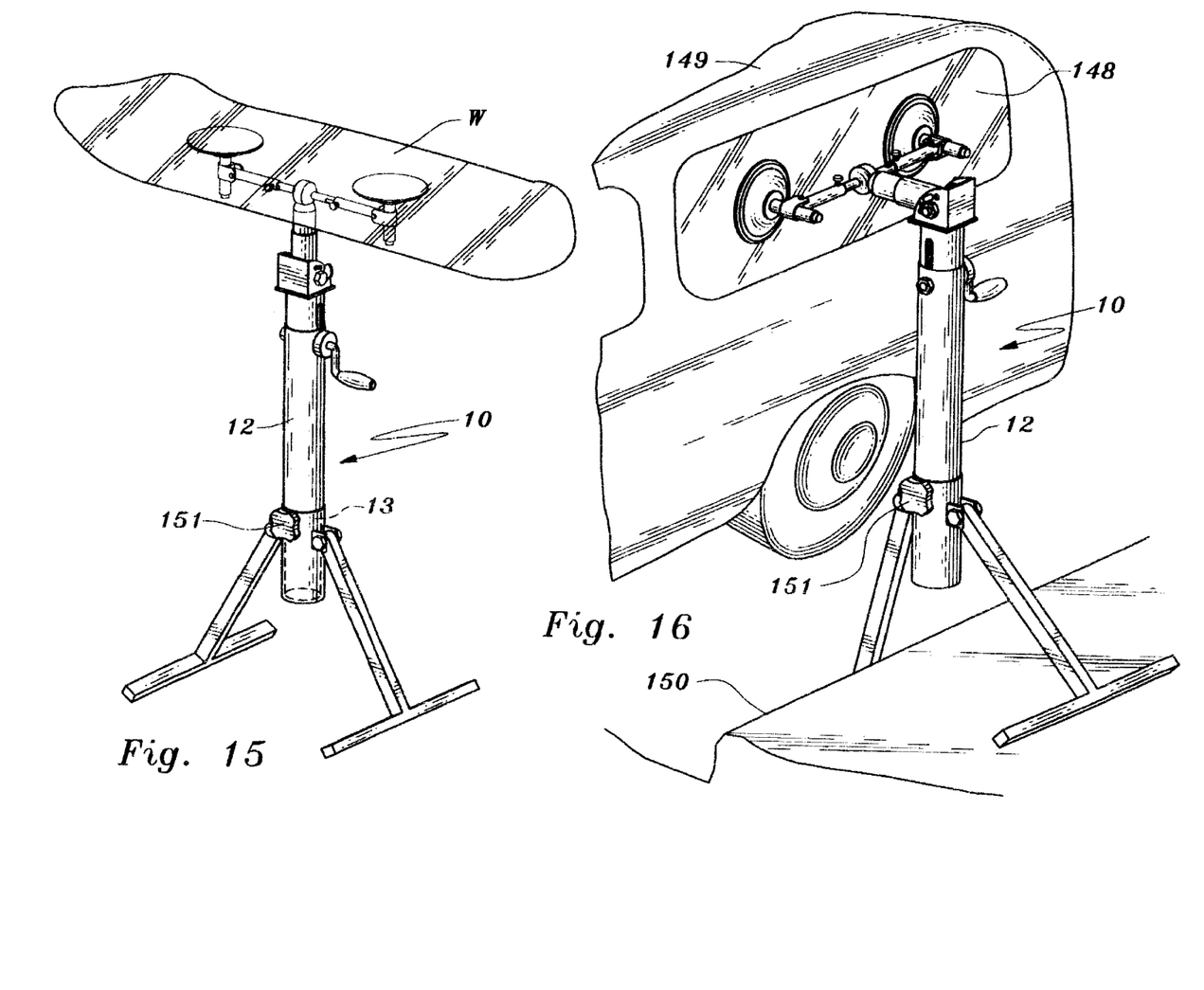
FIG. 15 shows the stand of FIG. 14 supporting a windshield.
FIG. 16 shows a stand supported lift employed to remove a sealed side window of a vehicle.

FIG. 15 shows the standing base 144 of FIG. 14 employed to hold a windshield W for inspection prior to its installation. As explained above, stub tube holder 33 may be adjusted in bracket 30 to be axially aligned. The suction cups 43 will then face upwardly to support the windshield W.

Figure 10:
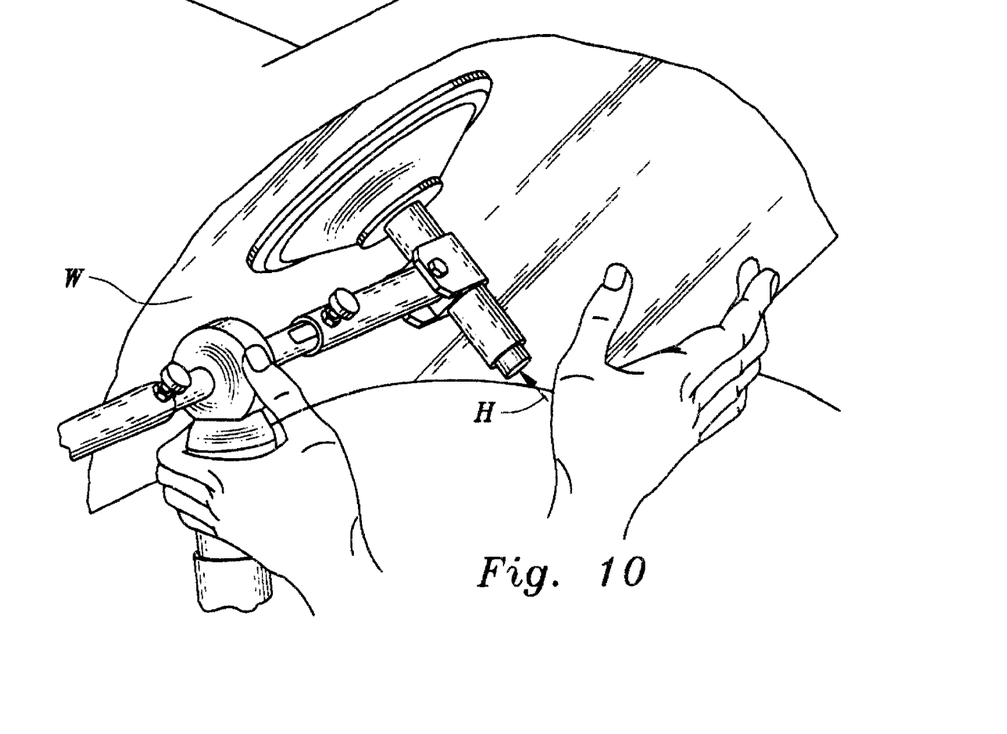
FIG. 10 is a pictorial view of the suction cup being enabled.

FIG. 16 shows the lift 10 of FIG. 10 arranged to apply pressure against the side window 148 of a van 149. The rigid stand 144 is braced against a curb 150 or similar secure support and the lift 10 angled to secure the suction cups 43 to the side window 148.

While only two applications of the lift 10 equipped with a rigid standing base 144 are shown, the uses are many. For example, the lift 10 may be used to remove the rear windshield W of a truck by bracing the stand against the wheel well.

Moreover, having thus described the invention, it should be apparent that numerous structural modifications and adaptions may be resorted to without departing from the scope and fair meaning of the instant invention as set forth hereinabove and as described hereinbelow by the claims.

We claim:

1. A device for use in stretching a windshield seal located between a windshield and a frame of a vehicle, the device comprising in combination:

a base at a first end thereof;

a windshield engagement end opposite said first end;

an adjustable length structure located between said windshield engagement end and said base; and a jack attached to said adjustable length structure to increase a length of said adjustable length structure and push said windshield engagement end away from said base, such that when the device is located between a substantially fixed surface and the windshield of the vehicle, the jack can cause the device to push against the windshield and stretch the windshield seal.

2. The device of claim 1 wherein said windshield engagement end includes at least one suction cup attached thereto.

3. The device of claim 2 wherein said jack is hydraulic.

4. The device of claim 2 wherein said jack is manually powered.

5. The device of claim 1 wherein said windshield engagement end includes at least two suction cups attached thereto.

6. The device of claim 5 wherein said at least two suction cups are spaced laterally away from each other and are locatable facing a substantially common windshield plane, such that each of said at least two suction cups can interface with an inside surface of the windshield simultaneously.

7. The device of claim 6 wherein said suction cups face at least partially away from the floor of the vehicle when said base of said device is abutting the floor of the vehicle.

8. A method for stretching a windshield seal that is located around a perimeter of a vehicle windshield, the steps including;

provided a force applying device with a base and a windshield engagement end spaced from the base, the force applying device configured to be adjustable to move the windshield engagement end away from the base;

positioning the base of the force applying device adjacent a surface of the vehicle, the surface at least partially facing the windshield;

locating the windshield engagement end of the force applying device abutting an inside surface of the windshield; and adjusting a length of the force applying device so that the windshield engagement end of the force applying device causes the seal around the perimeter of the windshield to be at least partially stretched.

9. The method of claim 8 wherein said providing step includes the further step of configuring the windshield engagement end to include at least one suction cup.

10. The method of claim 9 wherein said providing step includes the step of providing the windshield engagement end with at least two suction cups, said at least two suction cups spaced laterally relative to each other, said suction cups facing a plane adjacent an inside surface of the windshield when the base is located adjacent a floor of the vehicle.

11. A method for stretching a windshield seal that is located around a perimeter of a vehicle windshield, the steps including;

providing a force applying device with a base and a windshield engagement end spaced from the base, the force applying device configured to be adjustable to move the windshield engagement end away from the base;

positioning the base of the force applying device adjacent a surface of the vehicle, the surface at least partially facing the windshield;

locating the windshield engagement end of the force applying device abutting an inside surface of the windshield;

adjusting a length of the force applying device so that the windshield engagement end of the force applying device causes the seal around the perimeter of the windshield to be at least partially stretched; and locating the force applying device with the base abutting a floor of the vehicle, the floor at least partially facing an inside surface of the windshield.

12. The method of claim 11 wherein said adjusting step continues until the windshield seal is stretched sufficiently that a knife can access the seal for cutting the seal and removal of the windshield.

13. The method of claim 11 wherein said providing step includes the step of configuring the force applying device to have at least two telescoping shafts, one of the telescoping shafts located adjacent the base, one of the telescoping shafts located adjacent the windshield engagement end, and a jack between the at least two telescoping shafts that can move the at least two telescoping shafts longitudinally relative to each other.

* * * * *